June 11, 1957  M. MORSE  2,795,144
MOISTURE-PROOFING DEVICE
Filed May 11, 1953  3 Sheets-Sheet 1
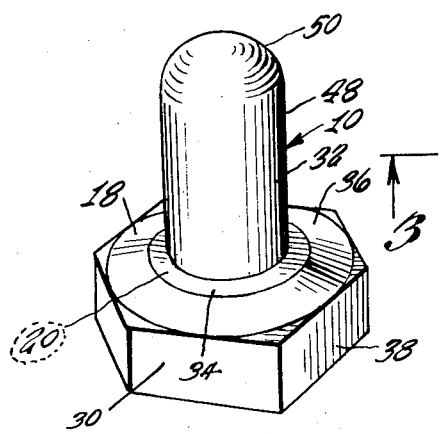
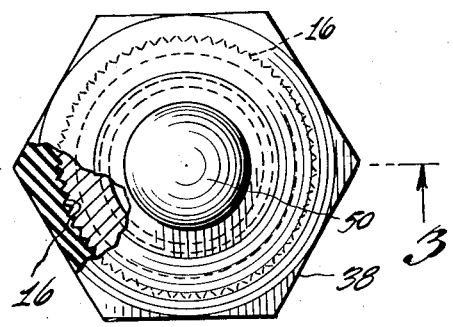
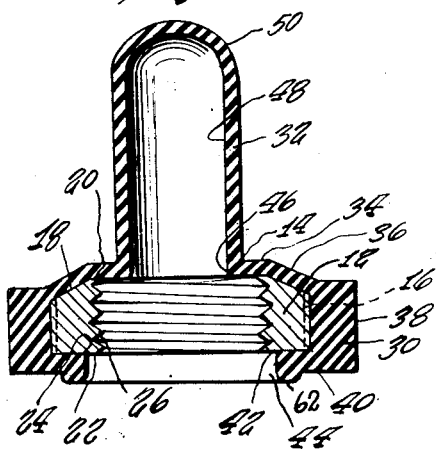
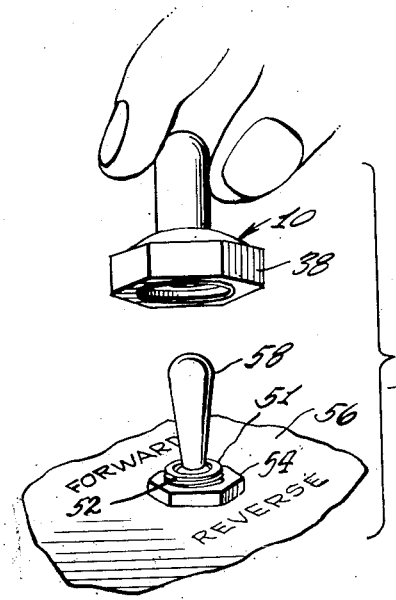
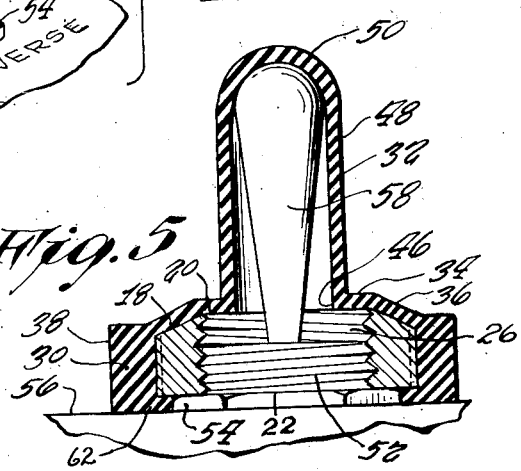

June 11, 1957 M. MORSE 2,795,144
MOISTURE-PROOFING DEVICE
Filed May 11, 1953 3 Sheets-Sheet 2
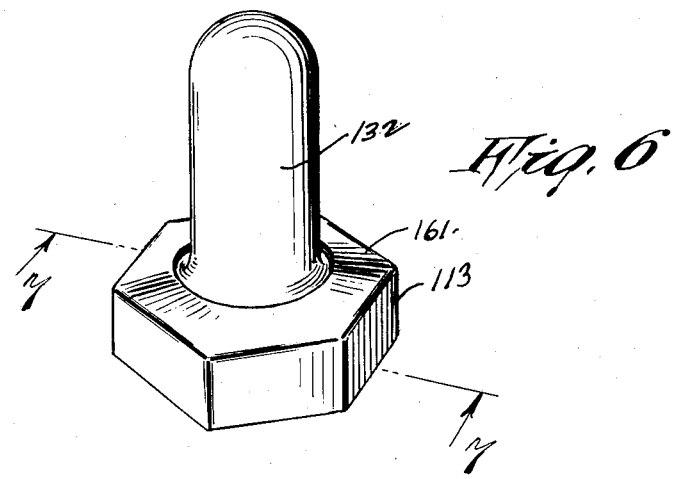
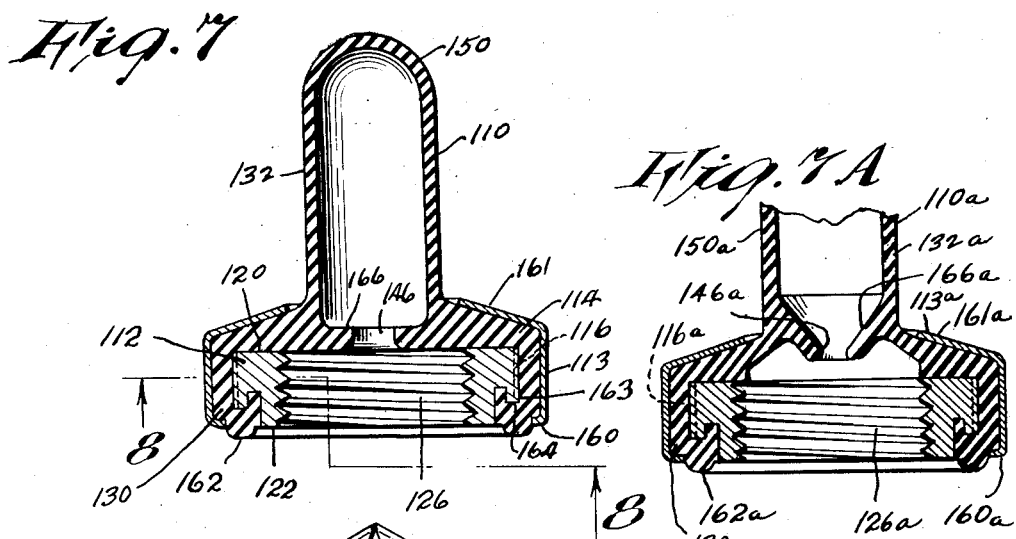
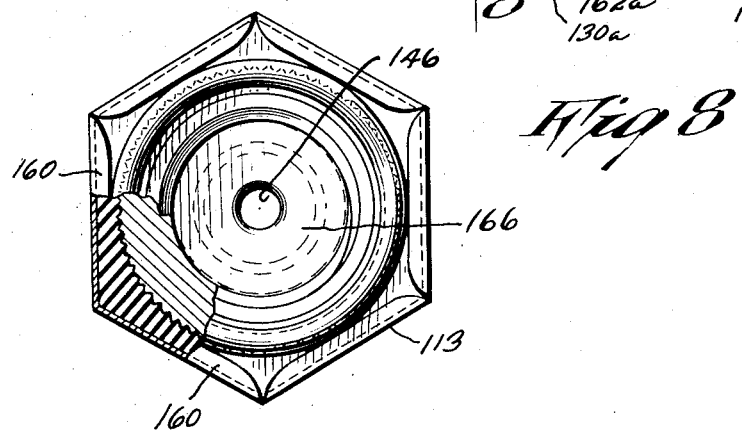

June 11, 1957   M. MORSE   2,795,144
MOISTURE-PROOFING DEVICE
Filed May 11, 1953   3 Sheets-Sheet 3
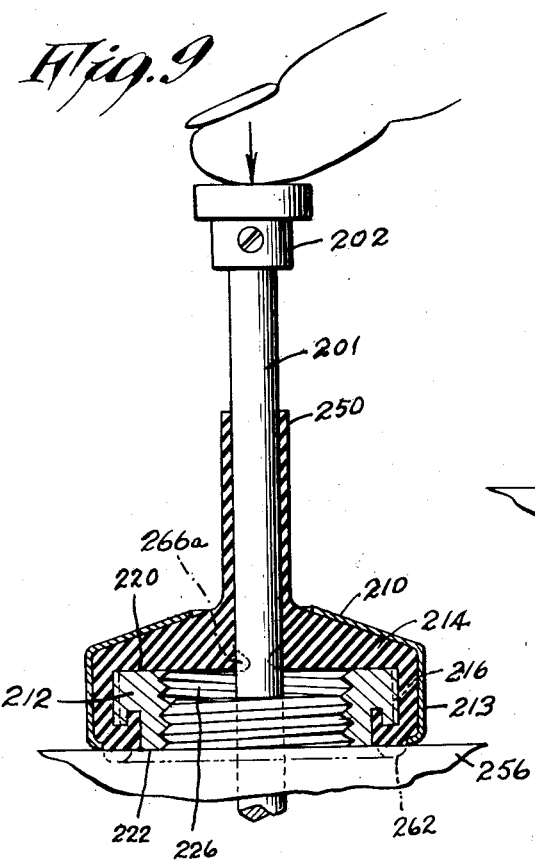
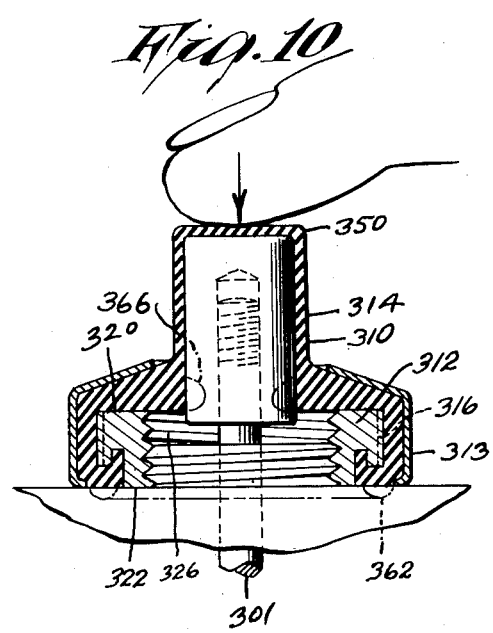
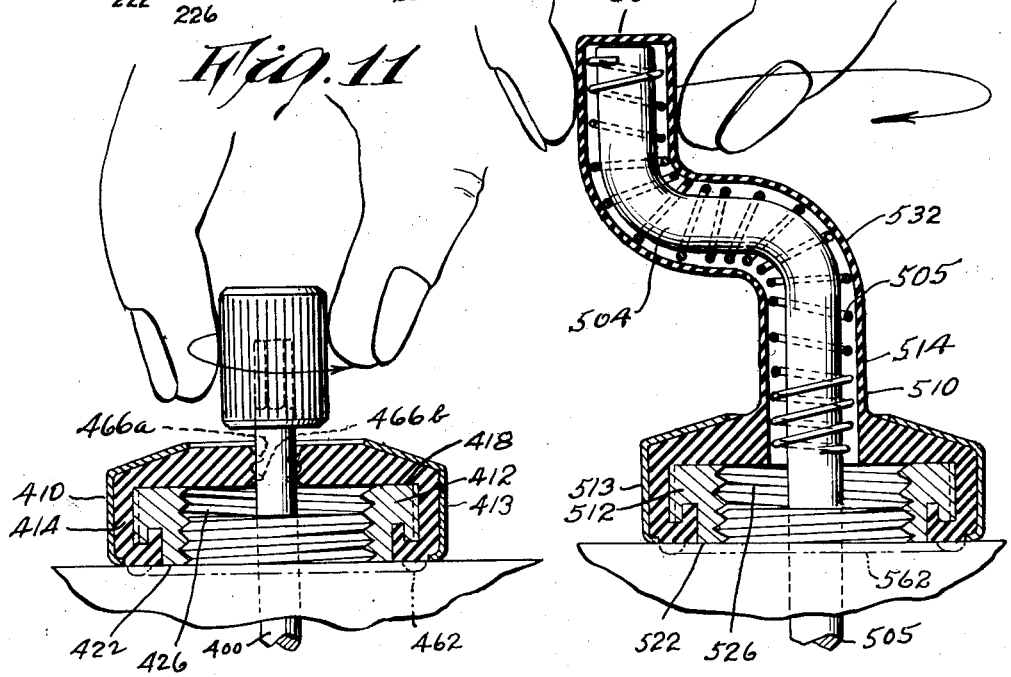

United States Patent Office 2,795,144
Patented June 11, 1957

2,795,144

MOISTURE-PROOFING DEVICE

Milton Morse, New York, N. Y.

Application May 11, 1953, Serial No. 354,052

8 Claims. (Cl. 74—17.8)

This invention relates generally to moisture-proofing devices, and more particularly to a resilient moisture-proof structure adapted to prevent the entry of fluids such as air, and water vapor into electrical devices having a movable operating element, as for example, switches of a type in which the circuit is opened and closed by means of a toggle.

In various communications equipment, there is usually a large number of toggle switches which are mounted through a solid panel encasing the equipment. These switches are vulnerable to the effects of air, moisture and/or liquids, and where the equipment is mounted on aircraft, vehicles, or vessels, into which water or gas may penetrate, the equipment would be rendered useless.

It is therefore among the principal objects of the present invention to provide hermetic sealing devices which are capable of engaging and completely enclosing the exposed parts of electrical toggle switches, or the like, which will protect the equipment by preventing fluids from entering the casing surrounding the equipment at the area of connection between the device and the casing.

Another object of the present invention lies in the provision of water-proofing structure which may be expediently installed and removed as a single unit, and without the use of special tools or skill.

Another object of the invention lies in the provision of moisture-proofing structure adapted to be fitted about a toggle switch which includes flexible resilient components which may be distorted to operate the switch disposed beneath the same, without interferring with the normal operations of the switch.

A feature of the invention lies in the fact that the same may be installed upon and removed from about a mounted toggle switch by using only the fingers of the hand, or if a particularly tight fit is required, by means of an ordinary socket wrench.

Another feature of the invention lies in the fact that the metal and resilient parts comprising the device are formed by molding the latter about the former, thereby forming a unit which is not easily damaged or torn apart.

The present invention finds utility not only with toggle switches, but also those of the rotating, reciprocating and cranking type.

The invention also is useful in maintaining a substantially vapor-proof seal about switches associated with hermetically sealed cabinets.

At high altitudes in aircraft and rockets the present devices prevent reverse leakage of the gas normally under pressure in the equipment cabinet, preventing reduction of pressure with consequent arcing and explosion of condensers.

These objects and features, as well as other incidental ends and advantages, will become more clearly apparent during the course of the following disclosure, and be pointed out in the appended claims.

On the drawings, to which reference will be made in the specification, similar reference characters have been employed to designate corresponding parts throughout the several views.

Figure 1 is a view in perspective showing an embodiment of the device.

Figure 2 is a plan view of the embodiment, partly in section to show detail.

Figure 3 is a vertical central sectional view as seen from the plane 3—3 on Figure 2.

Figure 4 is an exploded view showing the engagement of the device with a conventional toggle switch.

Figure 5 is a vertical central sectional view, corresponding to that seen on Figure 3, but showing the device in an engaged position upon the switch shown on Figure 4.

Figure 6 is a view in perspective showing a second embodiment of the invention.

Figure 7 is a vertical sectional view as seen from the plane 7—7 on Figure 6.

Figure 7a is a fragmentary sectional view corresponding to Figure 7 but showing alternate construction.

Figure 8 is a bottom plan view partly in section as seen from the plane 8—8 on Figure 7.

Figure 9 is a vertical sectional view of a third embodiment of the invention.

Figure 10 is a vertical sectional view of a fourth embodiment of the invention.

Figure 11 is a vertical sectional view of a fifth embodiment of the invention.

Figure 12 is a vertical sectional view of a sixth embodiment of the invention.

In accordance with the invention, the device, generally indicated by reference character 10, comprises broadly: a nut element 12, a boot element 14.

The nut element 12 is preferably formed from machined brass or other suitable metal. It is of irregular configuration best seen on Figures 2 and 3, being bounded by a serrated peripheral edge 16, a sloping upper surface 18, a top surface 20, a lower surface 22. A threaded centrally disposed bore 26 extends from the lower surface 22 to the top surface 20, and is of a pitch and thread size corresponding to that of the threaded bushing 52 of the switch 51 with which the device 10 is engageable.

The boot element 14 includes a nut-enclosing member 30 upon which there is integrally formed a resiliently deformable member 32.

The nut-enclosing member is molded directly upon the nut element 12 and includes a top portion 34, a sloping portion 36, an outer wrench-engaging portion 38, a plate-contacting portion 40, having an upper surface 24 with an edge 42 which bounds the opening 44. The lower opening 44 permits entry of the threaded bushing 52 to engage the threads on the bore 26, and the sides of a top opening 46 form means for integration with the deformable member 32.

The member 32 is of generally tubular configuration, including a hollow elongated portion 48 and a hemispherical top portion 50. As the boot element is formed in one piece, there is no opening through which moisture may pass other than the opening 44.

Referring to Figure 4, there may be seen an electrical switch 51 of the type contemplated for use in conjunction with the present invention, the same including a threaded bushing 52 engaged by a nut 54 which maintains the switch in position upon a plate 56 so that the toggle handle 58 may be manually operated. The device is installed by screwing the same upon the part of the threaded bushing 52 which extends above the nut 54 after the latter has been tightened. The device is then engaged as shown on Figure 5 so that the depending annular rib 62 is compressed tightly against the outer surface of the plate 56, thereby sealing off the only point at which moisture may enter. Once installed, the toggle handle 58 may be operated by pressing upon the deformable member, the force being transmitted to the toggle handle.

Turning now to the second embodiment of the invention illustrated in Figure 6 to 8, inclusive, for the purpose of avoiding needless repetition certain of the parts corresponding to those of the first embodiment are given the same reference characters with the addition of the prefix "1."

The second embodiment differs from the first embodiment in several ways. Among these is the provision of a casing 113 for the exterior of the boot element 114. The casing 113 is preferably made of thin durable material, such as metal, and includes a plurality of bottom lips 160 and a top wall 161 which serves to positively retain the same upon the lower portion of the boot element.

The bottom wall of the boot element 114 is provided with a depending annular rib 162 which is adapted to be compressed to form a water and vapor-tight seal when compressed against the panel, or plate, such as the plate 56 shown in Figure 4. This compression occurs when the nut element 112 is tightened by hand or with a wrench (not shown), which engages the polygonal surface of the casing 113.

The nut element 112 has a downwardly projecting annular flange 163 which is spaced from the main body of the nut element and engages a corresponding groove 164 in the boot element (best seen in Figure 7). This flange 163 prevents the elastic lower portion of the boot element from mushrooming out from under the compression produced by the nut element 112.

Over compression of the lower portion of the boot element is prevented by the lower surface 122 of the nut element 114 engaging against the panel 56.

The boot element 114 is provided with an inwardly extending annular flange 166 having a central opening 146. The opening 146 is preferably of an effective diameter which is substantially less than the diameter of the switch toggle 58, at that point, so that when the device 110 is installed there is a substantially vapor and water tight seal produced about the toggle. The resiliency of the material of which the boot element is made, permits the toggle to be shifted while at the same time maintaining proper contact with the edge of the opening 146.

It may thus be seen that even if the top portion 150 of the device 110 should be worn through or ruptured, that the flange 166 will maintain a suitable seal so that the device may continue to be operative.

For certain uses it is desirable that the durometer of the resilient material of which the boot element is fabricated be relatively high. Under such conditions, I have found that adequate contact of the edge of the opening 146a is maintained when the flange 166a is arranged in a downwardly converging frustro-conical configuration. Such construction permits greater flexure of the portions of the flange 166a to maintain a seal under such conditions.

Certain of the other parts shown in Figure 7A have reference characters corresponding to Figure 7 with the addition of a suffix "a."

Turning now to the third embodiment of the invention illustrated in Figure 9, for the purpose of avoiding unnecessary repetition, certain of the parts corresponding to the prior described embodiments are given the same reference characters with the addition of the prefix 2.

This embodiment differs principally in the use of the device 210 with a reciprocatable shaft 201 having a push button 202.

In this embodiment, the inwardly directed annular flange 266a slidably engages the exterior surface of the shaft 201.

The top portion 250 is open. The flange 266a is shown in dot-dash line in its uncompressed position. Operation of the device may be facilitated by the addition of a suitable lubricant (not shown) on the shaft and which will have a non-deteriorating effect on the material of which the boot element 214 is composed.

Where desired the shaft 201 may have an electrical conductor substituted therefor, so that the device 210 may be used to introduce current into a closed chamber or housing, in an hermetic manner.

In the fourth embodiment shown on Figure 10, here again certain of the parts of the prior embodiments have the same reference characters with the addition of the prefix 3. The fourth embodiment differs from the third embodiment primarily in the retention of the closed top part 350 of the boot element 314.

This form is best suited for relatively short stroke reciprocatory movement of the shaft 301 under which circumstances the side walls of the upper portion of the boot element may either compress or buckle outwardly.

In the fifth embodiment, the invention is shown as incorporated with a rotary shaft 400, and other parts corresponding to the prior described embodiment are given the same reference characters with the prefix 4.

In order to obtain a vapor and water proof seal, a plurality of inwardly directed annular flanges are utilized and have been designated by reference characters 466a and 466b. These flanges act as compressed lips to bear against the exterior surface of the shaft 400.

The embodiment of the invention shown in Figure 12 has many points of similarity with the prior described embodiments, but it is to be noted that the sixth embodiment is particularly suitable for use in conjunction with cranks, such as the crank 504. The upper portion of the boot element 514 is extended a sufficient length to encompass the crank, as well as a friction reducing element 505 in the form of a helical spring. Here again, certain of the parts corresponding to the prior described embodiments are given the same reference characters with the addition of a prefix 5. As may be seen from a perusal of Figure 12, the shaft 505 may be rotated by the crank 504 while the upper portion 550 of the boot element 514 travels through a orbital path.

Where desired, other friction reducing means may be incorporated between the crank 504 and the boot element, such as a lubricant (not shown).

I wish it to be understood that I do not consider the invention limited to the exact details of structure shown and set forth in this specification, for obvious modifications will occur to those skilled in the art to which the invention pertains.

I claim:

1. A sealing device for use with a panel and a reciprocable element comprising: a unitary boot element having a hollow cavity, said boot element being composed of flexible material; a nut element composed of material which is harder than said boot element; said reciprocable member being receivable within said cavity; said nut element when moved toward said panel serving to compress an integral portion of said boot element between said nut and said panel.

2. A pressure sealing device for use with a control having a handle and a bushing passing through the wall of a hermetically sealed housing; said device comprising: a boot element composed of resilient material; a nut element which is more rigid than said boot element and adapted to engage said bushing; said boot element having first and second sealing means; said first means being disposed between said nut and said wall, and said second means being disposed outwardly of said nut and engaging said handle.

3. A pressure sealing device for use with a control having a handle and a bushing passing through the wall of a hermetically sealed housing; said device comprising: a boot element composed of resilient material; a nut element which is more rigid than said boot element and adapted to engage said bushing; said boot element having first and second sealing means; said first means being disposed between said nut and said wall, and said second means being disposed outwardly of said nut and engaging said handle, and having a frusto-conical shape.

4. For use with an offset shaft, a unitary sealing device comprising: a self supporting flexible member of elongated shape having an opening adapted to receive said shaft; the effective internal diameter of said member and the effective external diameter of said shaft being constructed and arranged to provide a space therebetween; means to maintain the inner end of said member in a substantially fixed position; said shaft being rotatable within said member whereby orbital flexure of said member is translated into rotary motion of said shaft.

5. For use with an offset shaft, a unitary sealing device comprising: a self supporting flexible member of elongated shape having a closed outer end and an opening adapted to receive said shaft; the effective internal diameter of said member and the effective internal diameter of said shaft being constructed and arranged to provide a space therebetween; means to maintain the inner end of said member in a substantially fixed position; said shaft being rotatable within said member whereby orbital flexure of said member is translated into rotary motion of said shaft; a spring in said space.

6. A sealing device for use with a panel comprising: a boot element; a nut element; and a casing element; said nut element in moving toward said panel compressing a portion of said boot element against said panel; said casing element being composed of material which is harder than said boot element and being disposed outwardly of and at least partially closing said boot element.

7. A sealing device for use with a panel comprising: a unitary boot element composed of resilient material, a nut composed of substantially rigid material and engaged by said boot element which completely surrounds said nut element except for the provision of an opening at one end thereof; said nut element having a principal axis and a planar surface disposed perpendicularly with respect to said principal axis; said boot element having a planar panel contacting portion thereof superposing said last mentioned surface to lie in parallel relationship with respect thereto, said panel contacting portion defining said above mentioned opening; annular rib extending outwardly from the exposed surface of said panel contacting portion at the edge of said opening; movement of said device toward said panel serving to flatten and distort said rib to resiliently constrict said opening.

8. A sealing device for use with a panel comprising: a unitary boot element composed of resilient material, a nut composed of substantially rigid material and engaged by said boot element which completely surrounds said nut element except for the provision of an opening at one end thereof; said nut element having a principal axis and a planar surface disposed perpendicularly with respect to said principal axis; said boot element having a planar panel contacting portion thereof superposing said last mentioned surface to lie in parallel relationship with respect thereto, said panel contacting portion defining said above mentioned opening; annular rib extending outwardly from the exposed surface of said panel contacting portion at the edge of said opening; movement of said device toward said panel serving to flatten and distort said rib to resiliently constrict said opening; said nut element having a serrated peripheral edge engageable with the inner surface of said boot element for preventing relative rotational motion therebetween.

References Cited in the file of this patent

UNITED STATES PATENTS

| 2,440,943 | Gonsett | May 4, 1948 |
| 2,462,023 | Johanson | Feb. 15, 1949 |
| 2,539,386 | Albert | Jan. 30, 1951 |

FOREIGN PATENTS

| 329,447 | Great Britain | Dec. 27, 1929 |